United States Patent [19]
Sanford

[11] Patent Number: 5,204,691
[45] Date of Patent: Apr. 20, 1993

[54] CATHODE RAY TUBE MOUNTING APPARATUS

[75] Inventor: Herbert F. Sanford, Littleton, Colo.

[73] Assignee: Alliant Techsystems, Inc., Littleton, Colo.

[21] Appl. No.: 675,667

[22] Filed: Mar. 27, 1991

[51] Int. Cl.$^5$ .............................................. H04N 1/21
[52] U.S. Cl. .................................. 346/1.1; 346/110 R
[58] Field of Search ............... 346/110 R, 139 R, 108, 346/160, 1.1

[56] References Cited

U.S. PATENT DOCUMENTS

| | | |
|---|---|---|
| 2,385,681 | 9/1945 | Brick .............................. 346/110 R |
| 4,039,127 | 8/1977 | Huffhines et al. .............. 346/110 R |
| 4,394,076 | 7/1983 | Manber et al. ................. 346/110 R |
| 5,072,239 | 12/1991 | Mitcham et al. ................. 346/108 |

Primary Examiner—Mark J. Reinhart
Attorney, Agent, or Firm—James R. Young

[57] ABSTRACT

Disclosed is a CRT mounting apparatus for mounting a CRT in a photographic process printer. The apparatus provides a CRT cradle that is precisely aligned with the CRT and fixed to the CRT using glue or other means. Fixed mounting brackets are assembled to a transport assembly within the printer and aligned with the media movement apparatus. When the CRT is installed in a printer, mounting trunnions on the CRT cradle fit precisely into slots in the fixed mounting brackets to provide precise alignment of the CRT to the media.

9 Claims, 2 Drawing Sheets

CATHODE RAY TUBE MOUNTING APPARATUS

CROSS REFERENCE TO RELATED APPLICATIONS

This application is related to application Ser. No. 07/650,690 filed Feb. 5, 1991 of Sturm, et al., entitled "CRT Beam Deflection Control System."

FIELD OF THE INVENTION

This invention relates to printers for computer systems and more particularly to Cathode Ray Tube (CRT) display systems within such printers. Even more particularly, the invention relates to an apparatus for mounting a CRT that allows field interchangability while maintaining the CRT in close alignment with the print media.

BACKGROUND OF THE INVENTION

Photographic process printers use a cathode ray tube (CRT) to project an image onto a photosensitive media. After the image is projected onto the media, the media is processed to develop the image. In order for this image to be recorded in focus and properly positioned on the photosensitive media, the CRT must be accurately aligned to the media. This alignment can be achieved in a laboratory or manufacturing environment using alignment instruments.

A problem exists, however, when a CRT must be replaced in a printer located away from a manufacturing environment, such as in a customer location. The replacement CRT must be precisely aligned with the media when installed. In prior art systems, the alignment, because of the accuracy requirements, is time consuming and expensive. Furthermore, when the CRT is installed, it must be adjusted for alignment with the media, requiring additional time and cost.

It is thus apparent that there is a need in the art for an improved method or apparatus which allows precise alignment of a CRT when the CRT is installed. There is further need for such an apparatus that removes the need for alignment instruments. A still further need is for such an apparatus that does not require adjustments when installed. The present invention meets these and other needs.

SUMMARY OF THE INVENTION

It is an aspect of the present invention to provide an apparatus for mounting a cathode ray tube into a predetermined location such as a photographic process printer.

It is another aspect of the invention to provide for easy interchangability of the CRT.

Another aspect is to provide a mounting apparatus that allows the CRT to be easily installed.

Yet another aspect is to provide such an apparatus that requires no adjustments when the CRT is installed.

A still further aspect is to provide for repeatability of alignment of the CRT to the predetermined location.

The above and other aspects of the present invention are accomplished with a CRT mounting apparatus that provides a CRT cradle which is precisely aligned to the CRT and then fixed to the CRT using glue or other means. Fixed mounting brackets that are aligned with the media movement apparatus are provided in a transport assembly within the printer. When the CRT is installed in the printer, mounting trunnions on the CRT cradle fit precisely into slots in the fixed mounting brackets. Since the mounting brackets are aligned with the media movement apparatus, and the CRT cradle is aligned to the CRT, the CRT will be automatically aligned to the media when the CRT is installed in the printer. Because of the CRT cradle and fixed mounting brackets, no alignment instruments are needed for installing and precisely aligning the CRT during field replacement. This apparatus allows the CRT to be aligned with six degrees of freedom.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
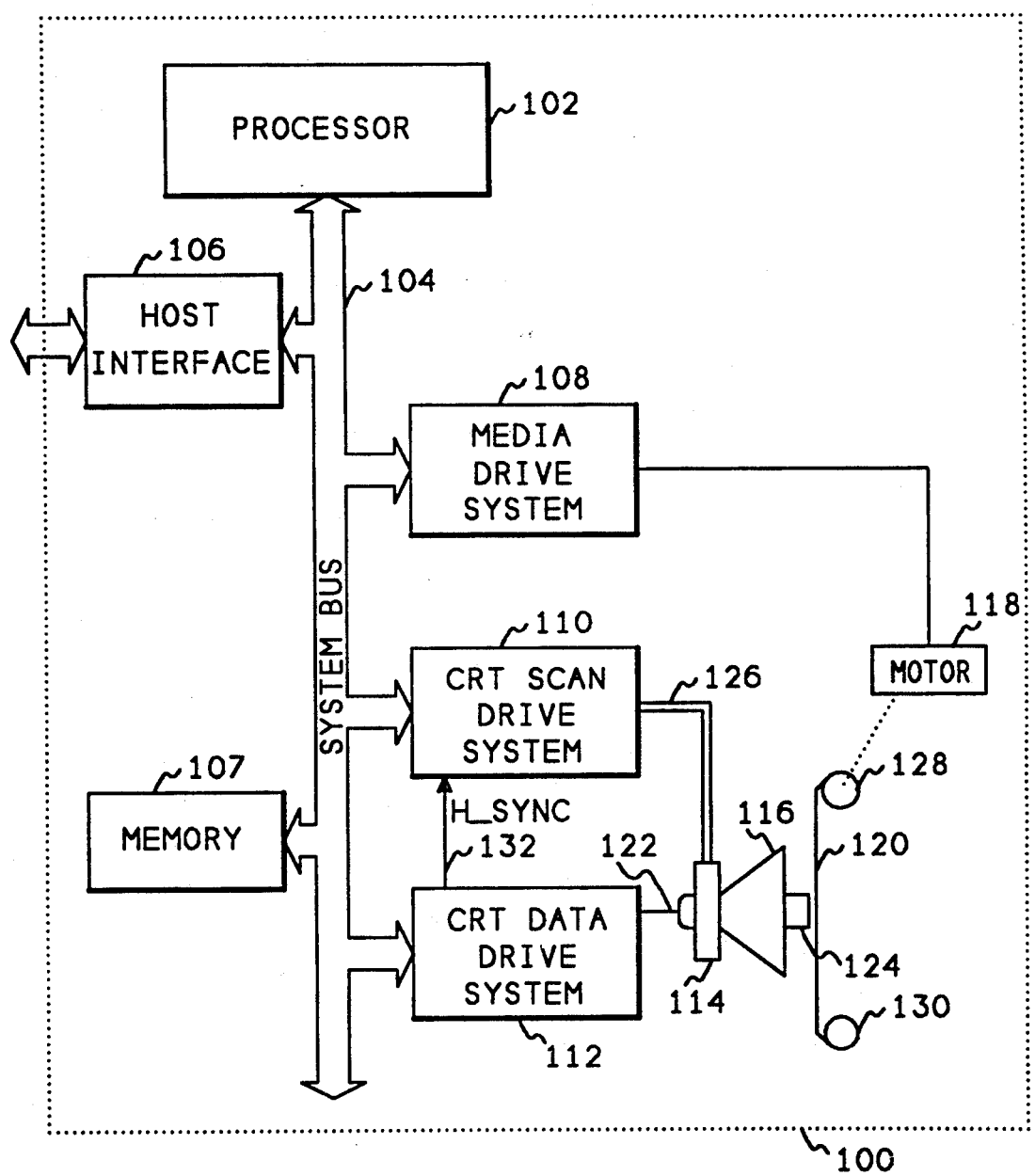
FIG. 1 shows a block diagram of a printer incorporating the present invention.

FIG. 1 shows a block diagram of a printer that incorporates the present invention. Referring now to FIG. 1, a printer 100 contains a processor 102 which communicates to other components of the system over a system bus 104. The processor 102 uses a host interface 106 to receive data from a host system (not shown). The processor 102 stores this received data in memory 107, and, during processing, the data is transferred from the memory 107 to the CRT data drive system 112. The output 122 of the CRT data drive system 112 is connected to a CRT 116 and used to modulate the electron beam within the CRT 116. Data displayed on the face of the CRT 116 is conducted through a CRT fiber optic faceplate 124 to print media 120. The print media 120 is a photosensitive media capable of recording the image displayed on the CRT and conducted through the CRT fiber optic faceplate 124. Deflection of the electron beam of the CRT 116 is controlled by a CRT scan drive system 110 whose output 126 is connected to a yoke 114 of the CRT 116.

The print media 120 is moved by a drive roller 128 which is powered by a motor 118. The motor 118 is operated by a media drive system 108 which is controlled over the system bus 104 by the processor 102.

Figure 2:
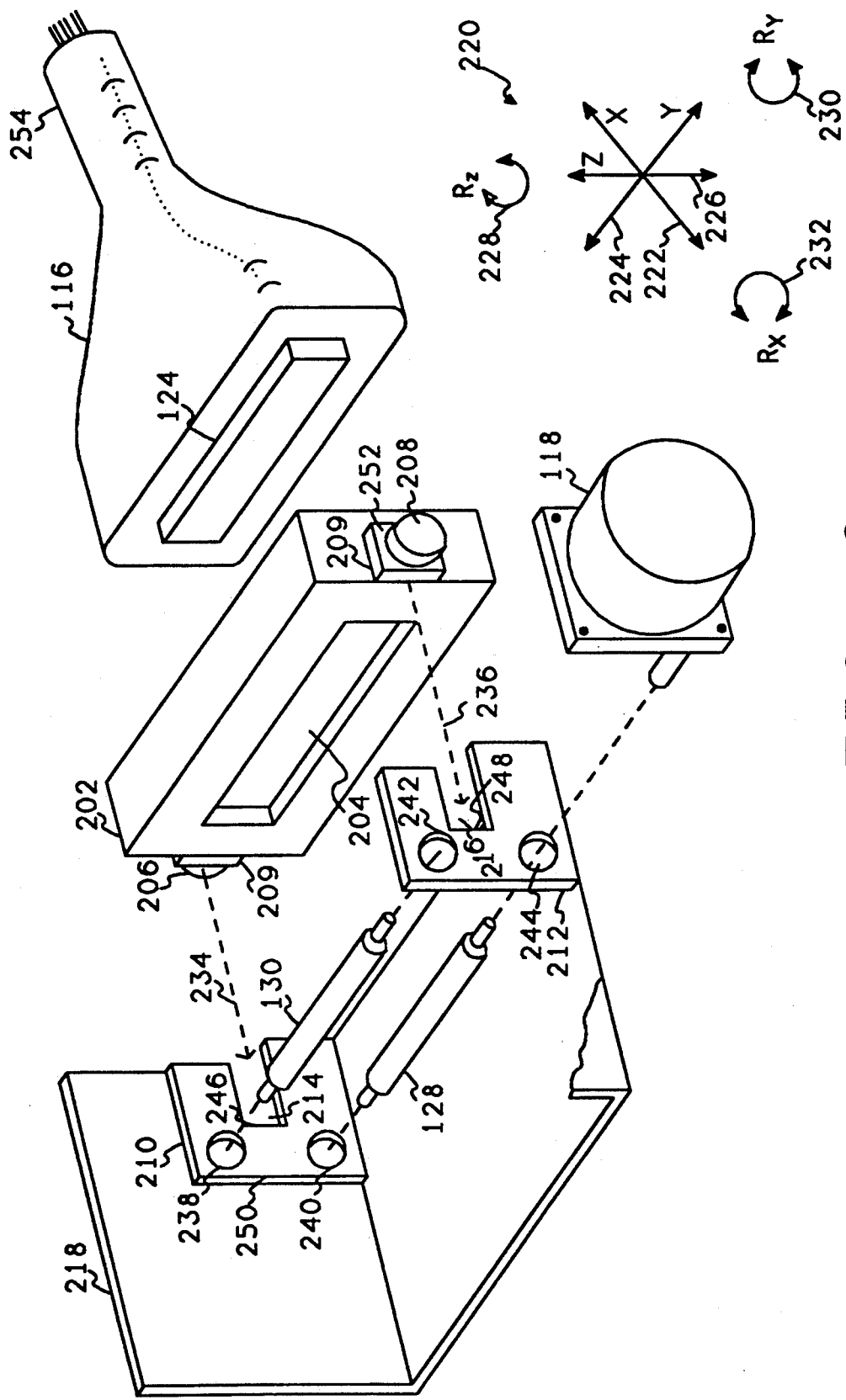
FIG. 2 shows a diagram of the CRT Cradle and its relationship to the mounting brackets.

FIG. 2 shows a diagram of the relationship between the CRT, the cradle, and the mounting brackets. Referring now to FIG. 2, the CRT 116 (also shown in FIG. 1) contains the fiber optic faceplate 124. The CRT 116 mounts to a CRT cradle 202 and the fiber optic faceplate 124 projects through a slot 204 within the cradle 202. The mounting of the CRT 116 to the CRT cradle 202 is done in a manufacturing environment where alignment fixtures can easily be used to precisely align the CRT 116 to the CRT cradle 202. During this alignment, the fiber optic faceplate is precisely aligned to a pair of mounting trunnions 206 and 208 which are permanently attached to, or formed into, the CRT cradle 202.

A pair of mounting brackets 210 and 212 are attached to a transport 218. The pair of mounting brackets 210 and 212 contain a pair of slots 214 and 216 respectively. Rollers 128 and 130 fit into holes 238, 240, 242, and 244 in the mounting brackets 210 and 212 to align the brackets 210 and 212 to the media (shown in FIG. 1). Thus, the media is precisely aligned to the slots 214 and 216, through the rollers 128 and 130, the roller mounting holes 238, 240, 242, and 244, and the brackets 210 and 212.

The CRT cradle 202 is mounted into the slots 214 and 216 as indicated by dashed arrows 234 and 236. Since the CRT 116 is precisely aligned to the mounting trunnions 206 and 208, and the media is precisely aligned to the slots 214 and 216, the CRT 116 will be precisely aligned to the media when the mounting trunnions 206 and 208 are placed in the slots 214 and 216.

An axis diagram 220 shows the six degrees of freedom of the CRT. These degrees of freedom will be discussed in the order of most critical alignment. Alignment in the X direction 222 is accomplished by installing the CRT cradle 202 with the mounting trunnions 206 and 208 flush against the rear surfaces 246 and 248 of the slots 214 and 216. This alignment is very important to keep the image in focus on the media which is in contact with rollers 128 and 130 and the fiber optic faceplate 124. The CRT 116 is prevented from rotating in the Rz direction 228 by keeping both trunnions 206 and 208 against the respective rear surfaces 246 and 248. This ensures that both sides of the fiber optic faceplace 124 will be the same distance from the media and therefore the image on both sides of the media will be in focus.

Alignment in the Y direction 224 is accomplished by placing blocks 209 of the CRT cradle against a surface 250 of mounting bracket 210. The outside surfaces 252 of the blocks 209 are made to fit precisely between the surfaces 250 of brackets 210 and 212. This alignment keeps the image properly aligned to each side of the media. The CRT 116 is prevented from rotating in the Rx direction 232 by keeping both trunnions 206 and 208 against the bottom of the slots 214 and 216. Keeping the trunnions 206 and 208 against the bottom of slots 214 and 216 also provides alignment in the Z direction 226. The CRT 116 is prevented from rotating in the Ry direction 230 by securely mounting the neck of the CRT 116 at location 254.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. Apparatus for precisely mounting a CRT to a transport, said apparatus comprising:
   means for fixing at least two alignment pins to the CRT, said pins being aligned in three axes to a display area of said CRT;
   alignment bracket means fixed to the transport;
   a slot formed in said alignment bracket means, said slot for receiving said alignment pins, and said slot being aligned in three axes with media rollers within said transport;
   whereby when said alignment pins are placed in the slot, the CRT is aligned in three axes to said media rollers through said alignment pins.

2. The apparatus of claim 1 further comprising:
   cradle means for containing said at least two alignment pins; and
   means for affixing said cradle means to said CRT.

3. The apparatus of claim 1 wherein said bracket means comprises a pair of brackets.

4. The apparatus of claim 3 wherein said slot comprises a pair of slots, one in each of said brackets.

5. Apparatus for mounting a CRT to a transport comprising:
   cradle means affixed to the CRT and aligned to said CRT in three axes;
   a pair of mounting trunnion means connected to a pair of sides of said cradle means; and
   bracket means containing a pair of slots for receiving said trunnion means, said bracket means being mounted to the transport to align in three axes with media roller means connected to the transport;
   whereby the CRT is aligned in three axes to said roller means through said mounting trunnion means.

6. The apparatus of claim 5 wherein said bracket means comprises a pair of brackets each containing one of said pair of slots.

7. A method for precisely mounting a CRT to a transport, said apparatus comprising:
   (a) fixing at least two alignment pins to the CRT;
   (b) aligning said pins to a display area of the CRT;
   (c) fixing alignment bracket means to the transport;
   (d) forming a slot in said alignment bracket means;
   (e) aligning said slot to media rollers connected to the transport; and
   (f) placing said pins in said slot.

8. The method of claim 7 further comprising the steps of:
   (a1) fixing said alignment pins to a cradle; and
   (a2) fixing said cradle means to said CRT.

9. The method of claim 7 wherein steps (c) and (d) further comprise the steps of:
   (c1) fixing a pair of brackets to the transport; and
   (d1) forming a slot in each of said brackets.

* * * * *